(12) United States Patent
Iyer et al.

(10) Patent No.: US 7,552,288 B2
(45) Date of Patent: Jun. 23, 2009

(54) SELECTIVELY INCLUSIVE CACHE ARCHITECTURE

(75) Inventors: Ravishankar Iyer, Portland, OR (US); Li Zhao, Beaverton, OR (US); Srihari Makineni, Portland, OR (US); Donald Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 11/503,777

(22) Filed: Aug. 14, 2006

(65) Prior Publication Data

US 2008/0040555 A1 Feb. 14, 2008

(51) Int. Cl.
  *G06F 12/08* (2006.01)
(52) U.S. Cl. .................. 711/141; 711/122; 711/124
(58) Field of Classification Search .......... 711/122, 711/130, 141, 146, 119
See application file for complete search history.

(56) References Cited

U.S. PATENT DOCUMENTS

| | | | | |
|---|---|---|---|---|
| 5,963,978 | A * | 10/1999 | Feiste ..................... | 711/158 |
| 6,073,212 | A * | 6/2000 | Hayes et al. ............ | 711/122 |
| 6,347,363 | B1 * | 2/2002 | Arimilli et al. .......... | 711/150 |
| 6,463,507 | B1 * | 10/2002 | Arimilli et al. .......... | 711/122 |
| 2004/0260880 | A1 | 12/2004 | Shannon et al. ......... | 711/122 |
| 2005/0114605 | A1 | 5/2005 | Iyer ........................ | 711/133 |
| 2006/0143408 | A1 * | 6/2006 | Sistla ..................... | 711/145 |
| 2007/0073974 | A1 * | 3/2007 | Averill et al. ............ | 711/133 |

FOREIGN PATENT DOCUMENTS

EP 905627 A1 * 3/1999
WO WO 9923565 A1 * 5/1999

OTHER PUBLICATIONS

U.S. Appl. No. 11/503,633, filed Aug. 14, 2006, entitled, "Providing Quality Of Service (QoS) For Cache Architectures Using Priority Information," by Li Zhao, Ravishankar Iyer, Ramesh Illikkal, Srihari Makineni and Donald Newell.
U.S. Appl. No. 11/513,554, filed Aug. 31, 2006, entitled, "Selective Storage Of Data in Levels Of A Cache Memory," by Srihari Makineni, Jaideep Moses, Ravishankar Iyer, Ramesh Illikkal, Donald Newell and Li Zhao.
U.S. Appl. No. 11/087,916, filed Mar. 22, 2005, entitled "A Cache Eviction Technique For Reducing Cache Eviction Traffic" by Christopher J. Shannon, et al.
U.S. Appl. No. 10/897,474, filed Jul. 23, 2004, entitled "A Cache Eviction Technique for Inclusive Cache Systems" by Christopher J. Shannon, et al.
U.S. Appl. No. 11/374,222, filed Mar. 13, 2006, entitled "Synchronizing Recency Information In An Inclusive Cache Hierarchy" by Christopher J. Shannon, et al.

* cited by examiner

*Primary Examiner*—Jack A Lane
(74) *Attorney, Agent, or Firm*—Trop, Pruner & Hu, P.C.

(57) ABSTRACT

In one embodiment, the present invention includes a method for maintaining data in a first level cache non-inclusively with data in a second level cache coupled to the first level cache. At the same time, at least a portion of directory information associated with the data in the first level cache may be maintained inclusively with a directory portion of the second level cache. Other embodiments are described and claimed.

14 Claims, 4 Drawing Sheets

SELECTIVELY INCLUSIVE CACHE ARCHITECTURE

BACKGROUND

Chip multiprocessors (CMPs) that include multiple processing cores on a single die can improve system performance. Such CMPs and other multiprocessor systems may be used for highly-threaded (or parallel) applications and to support throughput computing. To support high performance throughput computing, an on-die cache/memory hierarchy should support many cores/threads efficiently. In a multiple-core platform, cache space available per hardware thread is not growing at near the same rate as the compute density due to die area and cost constraints. Further, a large number of cores, e.g., in-order cores, results in increased memory pressure. Cache hierarchies allow for faster access latencies to the most currently used data, but also introduce the possibility of redundant information, thereby wasting cache space. While a CMP architecture enables usage of multiple levels of shared caches, traditional policies such as inclusive caches and central directories are not satisfactory.

There are typically three inclusion policies for a cache hierarchy: inclusive, non-inclusive and exclusive. Inclusive caches may cause redundant information to be stored across the cache hierarchy, but avoid snooping of lower-level caches when misses occur in higher-level caches (note that lower caches are close to cores and higher caches are close to main memory). However, if a line is being replaced in a higher-level cache, back-invalidation messages are sent to evict corresponding lines from lower-level caches. These back-invalidation messages increase traffic, consuming bandwidth. In addition, a least recently used line in a last-level cache (LLC) or other higher-level cache that is being replaced will cause the eviction of the same line from the lower-level caches, even if that line is most recently used in the lower-level caches. Thus, invalidating this line may cause a higher miss rate. Non-inclusive caches may avoid back-invalidation messages because they do not have to enforce inclusion but send snoops to lower-level caches even when the line does not exist in the higher-level caches. While an exclusive cache hierarchy may avoid both back-invalidation messages and redundant information, such arrangements can send snoops all the way to the LLC and also consume higher communication bandwidth because data is moved constantly between multiple levels of caches.

DETAILED DESCRIPTION

In various embodiments, a hybrid cache/directory architecture may enable policies for inclusive, non-inclusive, and selectively inclusive cache hierarchies. In this way, the available cache size in a platform may be increased. Furthermore, the amount of coherence traffic generated, e.g., across an on-die interconnect, may be reduced. In addition, embodiments may be used with a variety of adaptive policies (e.g., quality of service (QoS) policies, coherence-based region optimizations, and so forth) that may be used in different architectures.

In various embodiments, an extended directory cache may be located along with each portion (e.g., slice, bank, or the like) of a shared cache such as a last-level cache (LLC). This extended directory cache may act like a victim store for the LLC, but is used to store only directory information such as tag and directory information, e.g., in a tag array and a directory array (i.e., no data array). The directory array may include the same information as a directory array in a data portion of the LLC, e.g., a directory vector (also referred to herein as a bit vector) that indicates which previous level caches have a copy of the corresponding line.

At a high level, when a line is replaced from an LLC, instead of sending back-invalidation messages, its directory information (e.g., tag and directory vector) is stored into the directory cache. Back-invalidation messages may be sent to lower-level caches only when a line is replaced from this directory cache. In this way, non-inclusivity of data is possible, while maintaining inclusive tag information. As a result, traffic may be reduced while increasing cache size. As will be described further below, effective cache space can be further increased by enabling streaming memory accesses to bypass allocation in the shared cache (and only entering tag/directory information in the directory cache).

As will be described herein, various hardware, software, firmware and/or combinations thereof may be implemented to perform methods in accordance with embodiments of the present invention. Furthermore, while described herein particularly with regard to a multi-level cache architecture such as may be present in a multi-core processor, it is to be understood that the scope of the present invention is not so limited and embodiments may be implemented in other systems including multiple caches.

Figure 1:
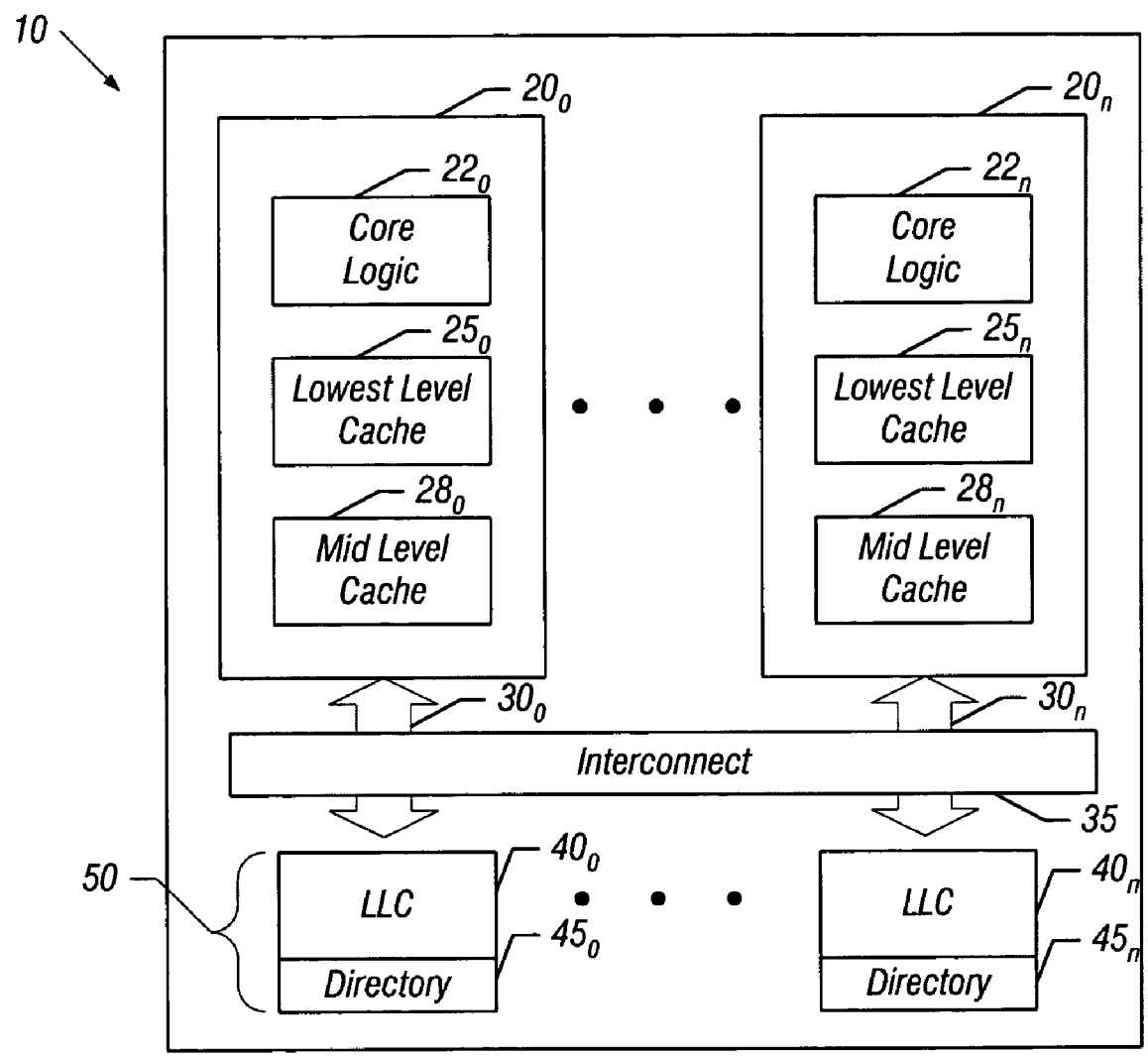
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-core processor including a plurality of processor cores $20_0$-$20_n$ (generically core 20). As shown in FIG. 1, in addition to core logic $22_0$-$22_n$ (generically core logic 22), each core may include multiple levels of a cache hierarchy. Specifically, as shown in FIG. 1 each core 20 may include a lowest-level cache $25_0$-$25_n$ (generically cache 25). In one embodiment, cache 25 may correspond to an L0 cache, although the scope of the present invention is not so limited. Each core 20 may further include a mid-level cache $28_0$-$28_n$ (generically cache 28). Mid-level cache 28 may correspond to an L1 cache, in some embodiments.

Processor 10 may further include a last-level cache (LLC) 50 formed of a plurality of banks $40_0$-$40_n$ (generically bank or portion 40). LLC 50 may be a higher-level cache coupled to cores 20 via an interconnect 35, and which may include copies of the data present in the lower-level caches. As shown in FIG. 1, each core 20 may be coupled to interconnect 35 via a link $30_0$-$30_n$ (generically link 30). LLC 50 may act as a shared memory. That is, LLC 50 may be shared among the various cores 20 within processor 10. In contrast, the multi-level cache (MLC) hierarchy including lowest-level cache 25 and mid-level cache 28 may be formed of private caches, in which data is stored only for the associated core 20.

During operation, memory requests from execution units of a given core (which may be part of core logic 22) may first access the lowest level of the cache hierarchy before looking up any other caches within a system. Accordingly, for improved performance frequently accessed data may be present in the lowest possible cache level, i.e., cache 25. If the requested data is not present in cache 25, cache 28 may next be accessed to determine if the data is present there. In the embodiment shown in FIG. 1, each mid-level cache 28 is a final lookup point for each core 20 before a request is issued to LLC 50.

In various embodiments, processor 10 may have a selectively inclusive cache hierarchy. That is, while the cache hierarchy may be inclusive with respect to certain information, it is non-inclusive with respect to other information. Furthermore, at least portions of the cache hierarchy, even within a given level of the cache hierarchy, may include exclusive information. Specifically, directory-type information may be inclusive between LLC 50 and caches within cores 20, namely mid-level cache 28 and lowest-level cache 25. LLC 50 may further include directory portions $45_0$-$45_n$ (generically directory portion 45) that each may be associated with a portion 40 of LLC 50. Directory portion 45 may also be referred to herein as a directory cache (DirC). As will be described further below, selective inclusivity may be established by allowing data to be non-inclusive between at least LLC 50 and lower-level caches 28 and 25. In order to maintain cache coherency despite the non-inclusivity of data, when an entry or line in LLC 50 is to be evicted, directory information, which may include tag information and a directory vector such as a bit vector, may be inserted into the corresponding directory portion 45. Because such information is allocated into directory portion 45 only upon eviction from a corresponding bank 40 of LLC 50, exclusivity of this directory information between bank 40 and directory portion 45 exists. While described with this particular embodiment in the embodiment of FIG. 1, it is to be understood that the scope of the present invention is not so limited and processors may have different configurations in other embodiments. For example, while shown with a bank or slice implementation in the embodiment of FIG. 1, it is to be understood the scope of the present invention is not limited in this regard.

Figure 2:
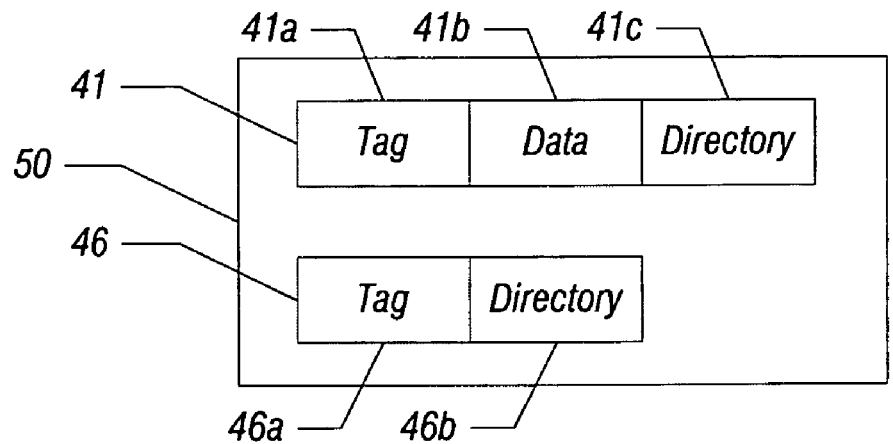
FIG. 2 is a block diagram of entries in a shared cache in accordance with an embodiment of the present invention

Referring now to FIG. 2, shown is a block diagram of fields present in a shared cache in accordance with an embodiment of the present invention. As shown in FIG. 2, shared cache 50, which may correspond to LLC 50 of FIG. 1, includes a data entry 41 and a directory entry 46. For example, data entry 41 may be present in a data portion of shared cache 50, while directory entry 46 may be present in a directory portion of shared cached 50. Data entry 41 includes a tag field $41_a$, a data field $41_b$, and a directory field $41_c$. In various embodiments, data entry 41 may correspond to a cache line. Tag field $41_a$ may include tag information used to access data entry 41, along with various state information, including for example, cache coherency state information. For example, state data may be associated with data entries 41 to indicate accessibility and/or validity of cache lines. As one example, state data may include the following states: modified (M), exclusive (E), shared (S), and/or invalid (I), otherwise known as so-called MESI states. Data field $41_b$ may include data stored in data entry 41, while directory field $41_c$ may include a directory vector, which may be a bit vector that indicates which of lower level caches associated with shared cache 50 (e.g., private caches) include a copy of the data in data field $41_b$. Directory entry 46 may include a tag field $46_a$ and a directory field $46_b$, which may include the same information as the corresponding tag field $41_a$ and directory field $41_c$. However, note that any such tag and directory information in a directory entry 46 may be exclusive of such tag and directory information in a data entry 41, as in various embodiments the data and directory portions of a shared cache may maintain exclusivity with respect to this directory information.

Figure 3:
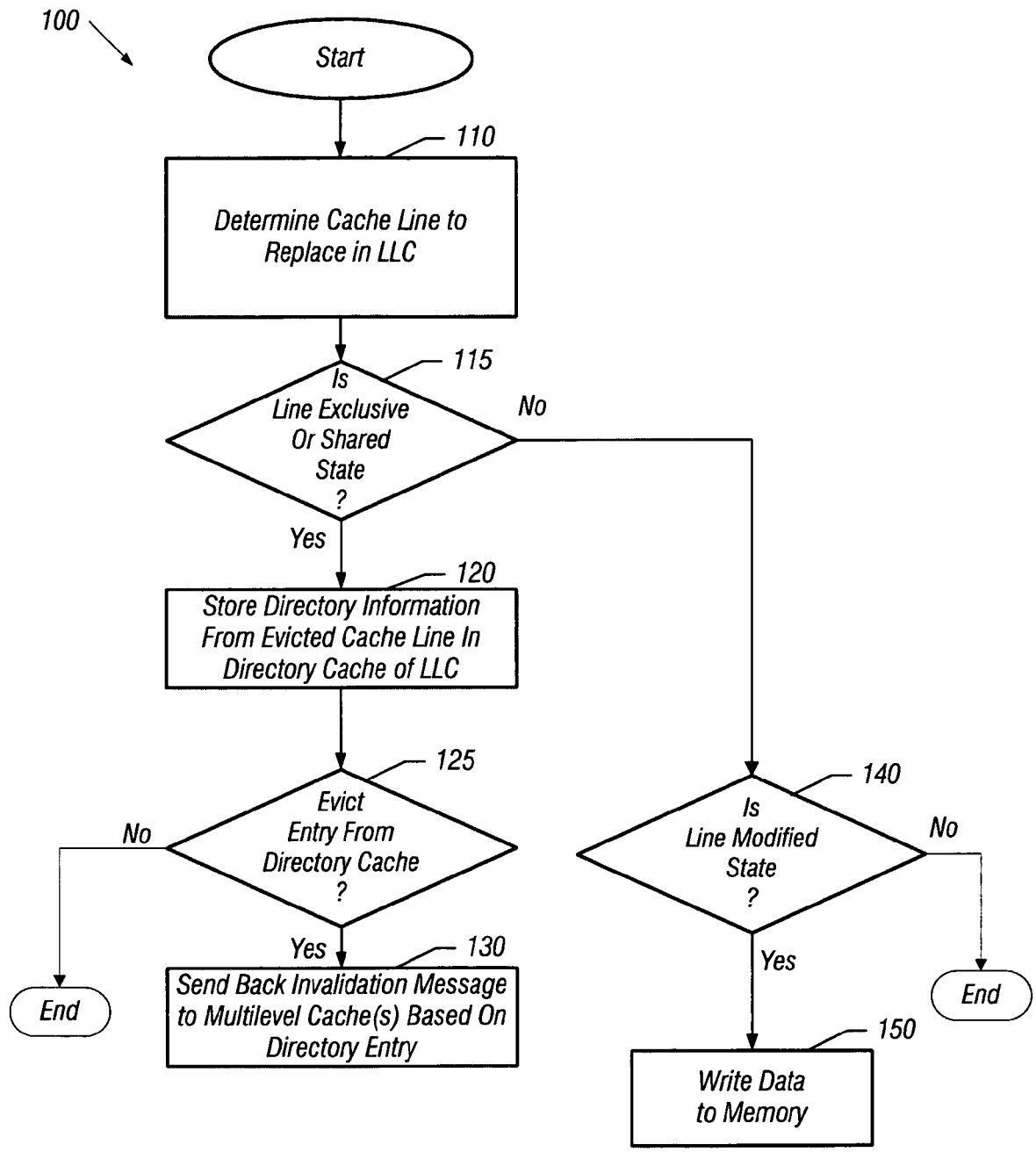
FIG. 3 is a flow diagram of a method for replacing data in a shared cache in accordance with an embodiment of the present invention.

Referring now to FIG. 3, shown is a flow diagram of a method for replacing data in a shared cache in accordance with an embodiment of the present invention. As shown in FIG. 3, method 100 may begin by determining which cache line to replace in a shared cache such as an LLC (block 110). For example, in various implementations a given replacement policy such as a least recently used (LRU) policy may be used to determine which cache line is to be evicted from the shared cache; however, various eviction schemes can be used in different cache memories.

From block 110, control passes to diamond 115. At diamond 115, it may be determined whether the line to be evicted is in an exclusive or shared state. If so, control passes to block 120. There, directory information from the evicted cache line may be stored in a directory cache of the shared cache (block 120). That is, to maintain inclusivity of directory information with lower levels of a cache hierarchy, tag and directory fields of the evicted cache line may be stored in an entry in a directory portion of the shared cache. In this way, directory inclusivity may be maintained, thus avoiding the need to send back-invalidation messages from the shared cache to one or more private caches indicated to potentially include a copy of the data in the evicted line. In this way, reduced bus traffic can result. While not shown in FIG. 3, at this point new data may be stored in the location previously occupied by the evicted cache line.

Note that during later system operation, however, a directory entry allocated into the directory cache may be evicted therefrom, e.g., pursuant to an LRU policy. Still with reference to FIG. 3, it thus may be determined whether a directory entry is to be evicted from the directory cache (diamond 125). If no entry is to be evicted, method 100 may conclude. If instead, at diamond 125 it is determined that an entry is to be evicted from the directory cache, control passes to block 130. At block 130, a back-invalidation message may be sent to any multi-level caches that are indicated to potentially include data corresponding to the previously evicted data in the shared cache (block 130). That is, if the directory entry indicates that a first private cache includes a copy of the data, a back-invalidation message may be sent to the first private cache to invalidate the corresponding cache line, if the data is still present there.

Referring still to FIG. 3, if at diamond 115 it is instead determined that a line to be evicted from the shared cache is not in an exclusive or shared state, there is no need to allocate an entry into the directory cache for this line. Accordingly, control passes from diamond 115 to diamond 140. At diamond 140, it may be determined if the line is in a modified state. If not (i.e., if the cache line is indicated to be invalid), method 100 may conclude. If however the cache line is determined to be in a modified state, control passes to block 150. At block 150, the data may be written directly to memory, which may be yet a higher level cache or system memory such as a dynamic random access memory (DRAM). Thus, at block 150 the data of the line is written back to memory without the need to store directory information in the directory cache. While shown with this particular implementation in the embodiment of FIG. 3, it is to be understood the scope of the present invention is not limited in this regard.

Figure 4:
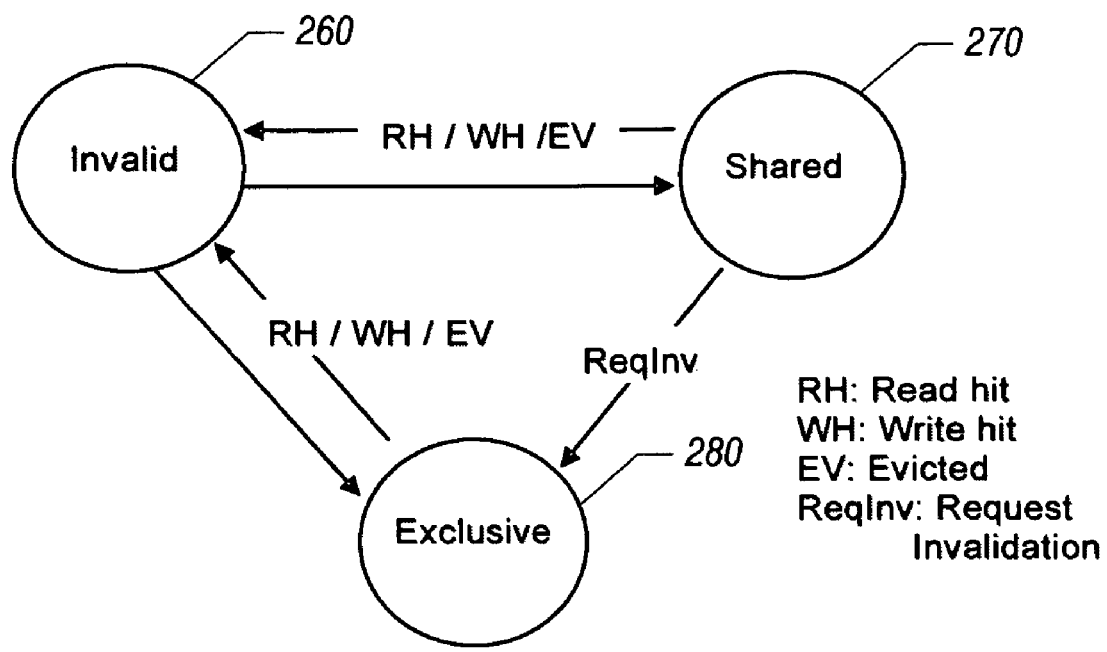
FIG. 4 is a state transition diagram for a directory cache in accordance with an embodiment of the present invention.

Referring now to FIG. 4, shown is a state transition diagram for a directory cache in accordance with an embodiment of the present invention. As shown in FIG. 4, various operations may occur when certain messages are received by the directory cache that regard an entry present in it. For example, a read hit (RIH), a write hit (WH) or an evicted (EV) message may cause an entry in the directory cache in a shared state 270 to be updated to an invalid state 260. Similarly, a RH, WH or an EV message to an entry in an exclusive state 280 may also cause the entry to be updated to invalid state 260. Furthermore, when an entry in shared state 270 is hit with a request for invalidation, invalidations are sent to the MLCs based on the directory information, and the corresponding state of the entry is moved to exclusive state 280. Of course, other implementations may effect different policies for state transitions of a directory cache in accordance with an embodiment of the present invention.

The following are examples of representative actions occurring in a cache memory in accordance with one embodiment of the present invention. When a cache line is replaced from the LLC, if its state is exclusive (E) or shared (S), the line's tag and directory entry are put into the directory cache (DirC) with its given state. If instead the line's state is modified (M), the line is written back to memory without touching the directory cache.

If a read request hits an exclusive line in the DirC, snoops may be sent out to the private cache based on the directory vector in directory cache. If the indicated cache does not have that line, a read request is sent to memory; if cache has the line, it is read therefrom. In either case, the response line is put into the shared cache with a state of E (the former case) or S (the latter case), and the state in DirC is changed to invalid (I). If the indicated private cache has that line in M state, the data is written to the shared cache with an S state, and the state in DirC is changed to I. If a read request hits a shared line in the DirC, a request is sent to one of the private caches including the data, the response line is put into the shared cache with an S state, and the state in DirC is changed to I.

If a request for ownership hits an exclusive line in the DirC, an invalidation message is sent out to the owning private cache based on the directory vector. If the indicated private cache does not have that line, a read request is sent to memory; if the private cache has the line in the E state, it sends a response to the shared cache. In either case, the response line is put into the shared cache in the E state, and the state in the DirC is changed to I. If the indicated private cache has that line in the M state, the data is written to the shared cache in the E state, and the state in DirC is changed to I. If a request for ownership hits a shared line in the DirC, invalidation messages are sent out to the indicated private caches based on the directory vector. A read request is sent to one of the private caches, the response line is put into the shared cache in the E state, and the state in the DirC is changed to I.

If a request to invalidate a line hits a shared line in the DirC, invalidations are sent to the indicated private caches based on the directory vector, and the state is changed to E. If a writeback request hits in the DirC, the data is written back into memory, and the state in the DirC is changed to I.

Since the directory cache may only include tag and directory arrays, it can cover a wide range of data with very small space consumption. For example, assuming a physical memory is 64 terabytes (TB) and the LLC has a line size of 64 bytes, to cover the same amount of cache size, the directory cache may consume approximately 6% of the space that is used for the cache. In other embodiments, a directory portion of a shared cache in accordance with an embodiment can be configured as a victim cache, i.e., may include data storage in addition to directory information. Furthermore, embodiments may support a region directory, that is, the directory organization may support snoop lookups for a large contiguous memory region at a time (e.g., for direct memory access (DMA) operations, such as for network input/output (I/O) operations).

Still further, embodiments may be used to support quality of service (QoS) schemes for cache reservation, selective cache allocation and cache region migration. For instance, data brought in from memory can avoid allocation in a shared cache due to non-inclusion. As one example, data that is known to be streaming in nature can bypass the shared cache, and only directory information may be stored in the directory portion if needed. Such bypassing may be used in connection with data accesses initiated by on-die coprocessors or other engines, for example. Support for various input/output (I/O) mechanisms for network processing may allow network data to bypass the LLC and pass directly to the private cache where the network processing is taking place.

In yet other embodiments, a directory cache in accordance with an embodiment may be configured as a tag cache for an off-die cache (e.g., DRAM cache). In other words, the directory structure of the LLC may be extended to maintain DRAM cache tags in addition to LLC tags. By co-locating these tags, area savings and improved policies (e.g., prefetching and replacement) may be realized. In addition, a directory cache can be extended to include profiling and optimization information. That is, the directory cache can further include profile information regarding the nature of data being touched by the processor, as well as to identify producer/consumer relationships since it maintains the bit vector.

Figure 5:
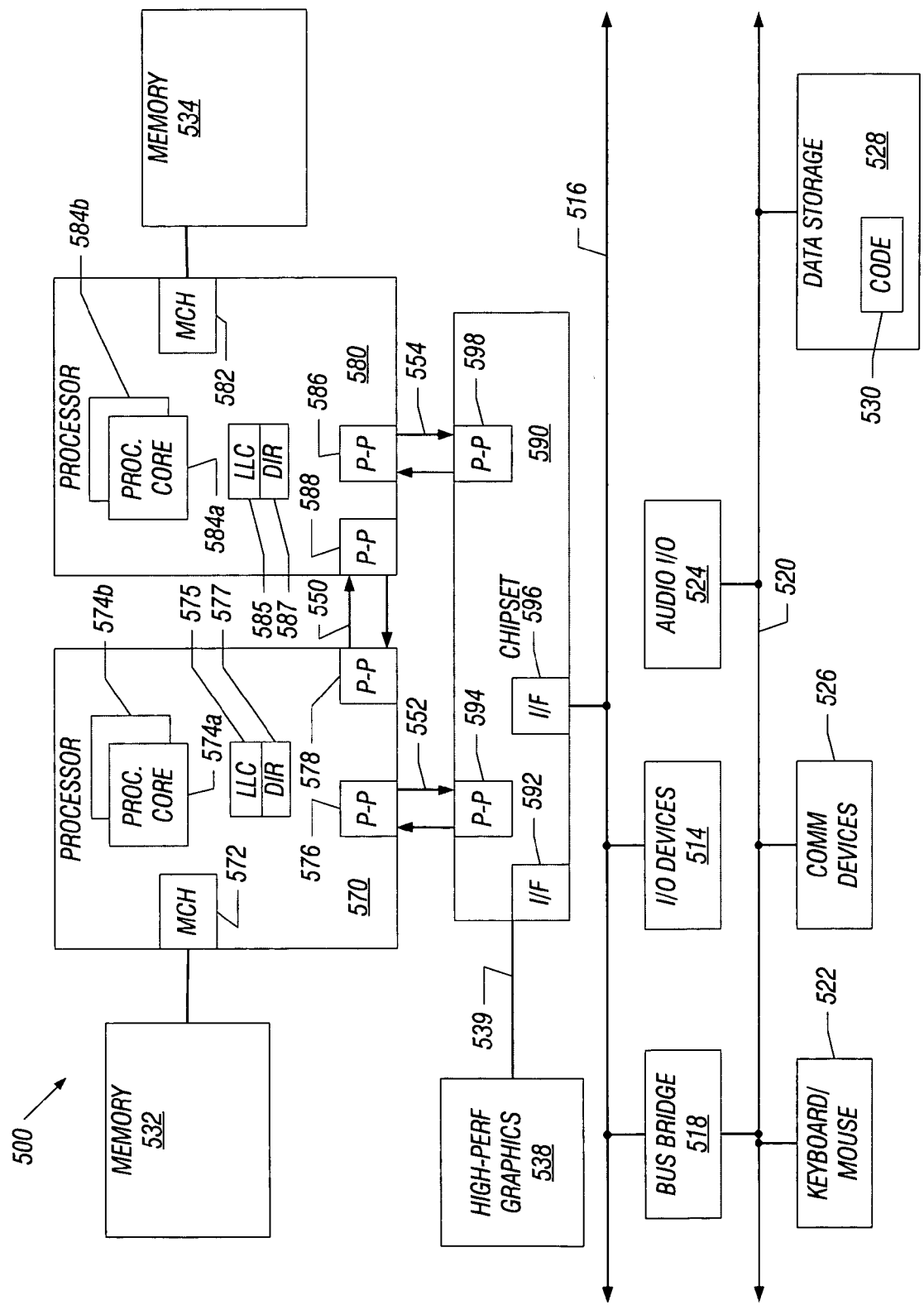
FIG. 5 is a block diagram of a multiprocessor system in accordance with an embodiment of the present invention.

Embodiments may be implemented in many different system types. Referring now to FIG. 5, shown is a block diagram of a multiprocessor system in accordance with an embodiment of the present invention. As shown in FIG. 5, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 5, each of processors 570 and 580 may be multi-core processors including first and second processor cores (i.e., processor cores 574*a* and 574*b* and processor cores 584*a* and 584*b*), although other cores and potentially many more other cores may be present in particular embodiments. While not shown in the embodiment of FIG. 5, it is to be understood that the first and second processor cores may each include one or more cache memories. Furthermore, as shown in FIG. 5 a last-level cache memory 575 and 585 including respective directory caches 577 and 587 may be coupled to each pair of processor cores 574*a* and 574*b* and 584*a* and 584*b*, respectively. To improve performance in such an architecture, a cache controller or other control logic within processors 570 and 580 may allow LLC's 575 and 585 to be selectively inclusive with one or more caches present in processors 570 and 580.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   maintaining data in a first level cache non-inclusively with a second level cache coupled to the first level cache; and
   maintaining at least a portion of directory information associated with the data in the first level cache and present in the first level cache inclusive with a directory portion of the second level cache while maintaining the directory portion of the second level cache exclusive with a data portion of the second level cache.

2. The method of claim 1, wherein the directory portion of the second level cache comprises tag information and a directory vector.

3. The method of claim 1, further comprising evicting an entry in the data portion of the second level cache and storing directory information from the entry in the directory portion of the second level cache.

4. The method of claim 3, further comprising maintaining data of the entry evicted from the second level cache in the first level cache by not sending an invalidation message to the first level cache.

5. An article comprising a machine-readable storage medium including instructions that if executed by a machine enable the machine to perform a method comprising:
   storing directory information in an entry in a first portion of a shared cache in a first directory cache of the shared cache associated with the first portion if the entry is to be replaced;
   evicting the entry from the first portion of the shared cache;
   maintaining a corresponding entry including first data of the evicted entry in a private cache coupled to the shared cache after replacement of the entry in the first portion of the shared cache;and
   maintaining inclusivity of at least a portion of the directory information between the corresponding entry in the private cache and the first directory cache via storing the directory information in the first directory cache wherein the first directory cache is maintained exclusive with the first portion of the shared cache.

6. The article of claim 5, wherein the method further comprises maintaining the corresponding entry by not sending an invalidation message to the private cache from the shared cache.

7. The article of claim 5, wherein the method further comprises maintaining non-inclusively data of the shared cache and data of the private cache.

8. The article of claim 5, wherein the method further comprises not storing the directory information in the first directory cache if the first data has been modified.

9. The article of claim 5, wherein the method further comprises accessing the first directory cache to determine in which of multiple private caches a copy of the first data is stored.

10. The article of claim 9, wherein the method further comprises invalidating the first data in the one of the plurality of private caches responsive to a request for ownership of the first data.

11. An article comprising a machine-readable storage medium including instructions that if executed by a machine enable the machine to perform a method comprising:
   maintaining data in a first level cache non-inclusively with a second level cache coupled to the first level cache; and
   maintaining at least a portion of directory information associated with the data in the first level cache and present in the first level cache inclusive with a directory portion of the second level cache while maintaining the directory portion of the second level cache exclusive with a data portion of the second level cache.

12. The article of claim 11, wherein the directory portion of the second level cache comprises tag information and a directory vector.

13. The article of claim 11, wherein the method further comprises evicting an entry in the data portion of the second level cache and storing directory information from the entry in the directory portion of the second level cache.

14. The article of claim 13, wherein the method further comprises maintaining data of the entry evicted from the second level cache in the first level cache by not sending an invalidation message to the first level cache.

* * * * *